March 27, 1956  M. A. ZINIUK  2,740,055
ELECTRONIC CONTROL

Filed Oct. 14, 1952  2 Sheets-Sheet 1

Michael A. Ziniuk
INVENTOR.

BY
ATTORNEY

March 27, 1956  M. A. ZINIUK  2,740,055
ELECTRONIC CONTROL
Filed Oct. 14, 1952  2 Sheets-Sheet 2

Michael A. Ziniuk
INVENTOR.

BY
ATTORNEY

United States Patent Office 2,740,055
Patented Mar. 27, 1956

2,740,055

ELECTRONIC CONTROL

Michael A. Ziniuk, Detroit, Mich., assignor to Holly Carburetor Company, Detroit, Mich., a corporation of Michigan Application October 14, 1952, Serial No. 314,628

7 Claims. (Cl. 307—26)

The objects of this invention are:
1. With an input voltage 14 to 28 direct current, I desire an output of direct current reference voltage varying from 0–50 volt with a plus or minus ½% stability.
2. I also desire:
   a. An alternating current reference voltage.
   b. One or more alternative output of direct current reference voltages.
   c. Convenient adjustability.
   d. To isolate the individual direct current voltages by coupling condensers and transformers.
   e. To provide a frequency variation for the available alternative alternating current over a wide band of operating frequencies.
   f. To render the unit immune from humidity and temperature variations by "potting" the circuits in a thermosetting resin.

This invention relates to voltage supplies and, more particularly, to a direct current reference voltage generating system producing one or more stabilized and adjustable direct current potentials as well as an alternative alternating current outlet.

A conventional source of reference or bias potential in electronic circuits is a cell, battery, or voltage dividing network. Frequently, cells or batteries prove undesirable in equipment subjected to adverse temperature and humidity conditions, and in circuits requiring some appreciable degree of current flow from the source of reference or bias potential. Any appreciable flow of current lowers the voltage.

It is an object of the present invention, therefore, to provide a source of one or more stable but adjustable direct current potentials in the range from 0 to approximately 50 volts.

A further object of the invention is to supply means to supply an amplitude stabilized alternating current potential of regulated, yet adjustable, frequency over a range up to 10:1 ratio, suitable for reference purpose applications in electronic circuits.

In accordance with the present invention there is provided a direct current voltage generator, comprising a single voltage or multi-voltage reference potential source. A 14 or 28 volt direct current power input supplies the necessary filament and input to a dynamotor plate supply. A gas filled voltage regulator tube in conjunction with a dropping resistance serves to drop to, and to hold at the required level the plate supply voltage produced by the dynamotor. The regulated direct current high voltage feeds an R-C or wien bridge oscillator which generates an alternating current potential of stable, but adjustable, amplitude and frequency. Its output feeds one or more rectifiers and filters which are isolated and individually adjustable with reference to the direct current output voltage. The oscillator frequency is adjustable by varying its frequency controlling resistances.

Figure 3:
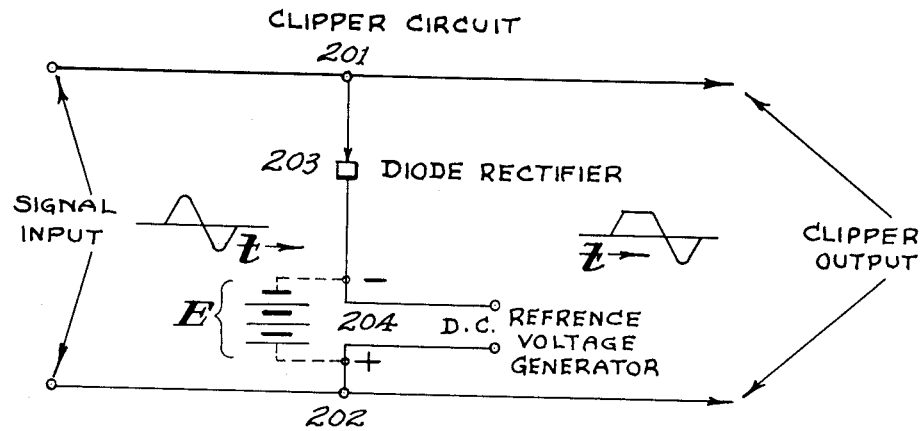

Fig. 3 shows a clipper circuit which is one application of my invention. This clipper circuit merely shows one application where the reference voltage system may find use and where moderate current flow will occur. Usually a battery source is utilized in the clipper which is the circuit shown in Fig. 5.

Figure 4:
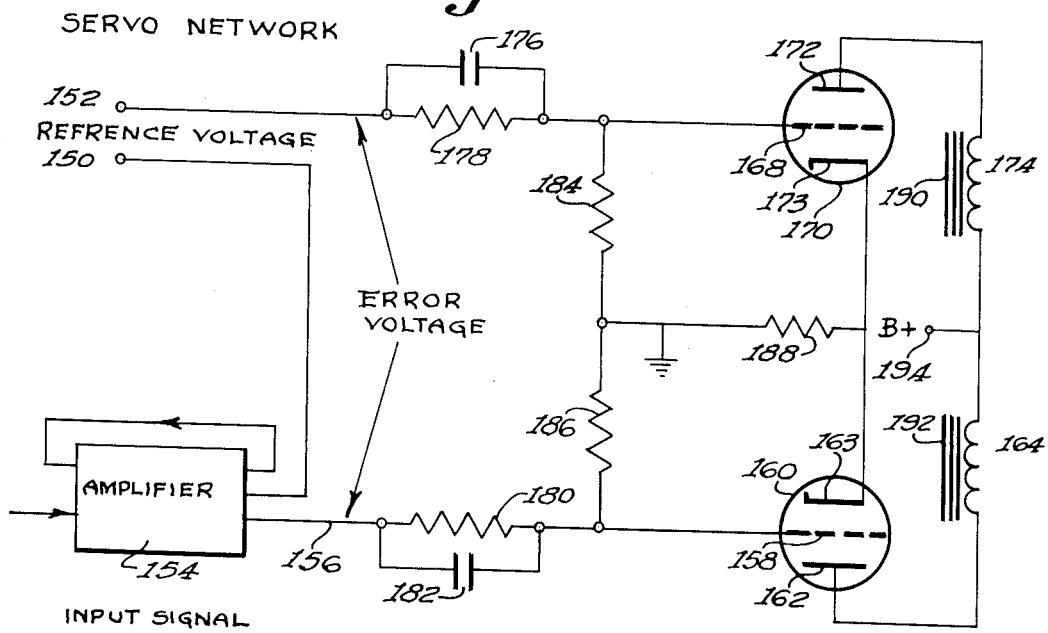

Fig. 4 shows a servo-network which is another application of my invention. In this Figure 4 the servo-network merely shows another possible application of the reference voltage generator where current flow is required along with reference voltage stability. The reference voltage in this case serves in a comparison circuit where the voltage difference between it and the second voltage is applied to the succeeding servo amplifier which actuates the controller. In other words, the reference voltage serves to establish a level about which the systm controls.

Figure 5:
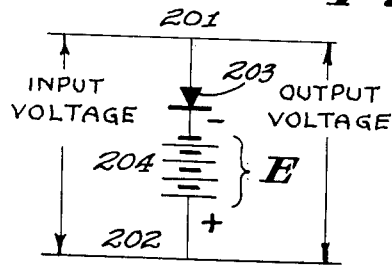

Fig. 5 shows the battery circuit which my invention replaces. In Figure 5 the circuit shown receives an input voltage which is of some varying nature. During the portion of the cycle when 201 is positive and 202 is negative, the output voltage is equal to the input voltage because the diode rectifier 203 will not pass current in the direction 202 to 201. However, when 201 is negative and 202 is positive and the input voltage of battery 204 exceeds the value of E, the potential E can no longer buck the input voltage over the value E and a "shorting out" or limiting or clipping occurs. In other words, the output voltage is not permitted to exceed the value of E. In the reverse polarity of input voltage (when 201 is positive and 202 is negative) the output is permitted to rise unlimitedly because the diode will not pass current in this direction and hence, will not short or limit the voltage.

Figure 1:
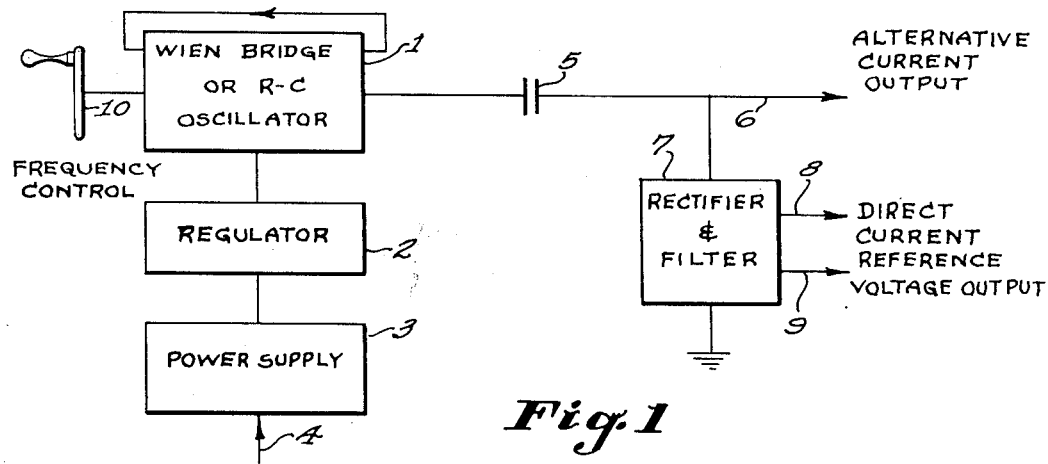
Fig. 1 is the diagrammatic representation of my invention.

Description of Fig. 1

1 is a stabilized type of low frequency oscillator.

2 is a high voltage regulator which may be a gas filled cold cathode tube.

3 is a plate power supply preferably in the form of a direct current dynamotor (alternatively it could be of the more conventional transformer type).

4 is the primary source of direct current, 14 volts to 28 volts, for dynamotor 3.

5 is the coupling capacitor (represented by 7) which blocks the flow of direct current and couples the alternating current output of the oscillator 1 to the rectifier circuit represented by 7.

6 is the alternating current output as an alternative to the direct current outlets 8 and 9, one of which will be positive and the other will be negative. Either outlet 8 or outlet 9 may be grounded.

10 is the frequency adjustment control for the low frequency oscillator 1. This can be locked in position when a frequency reference signal is not desired.

Figure 2:
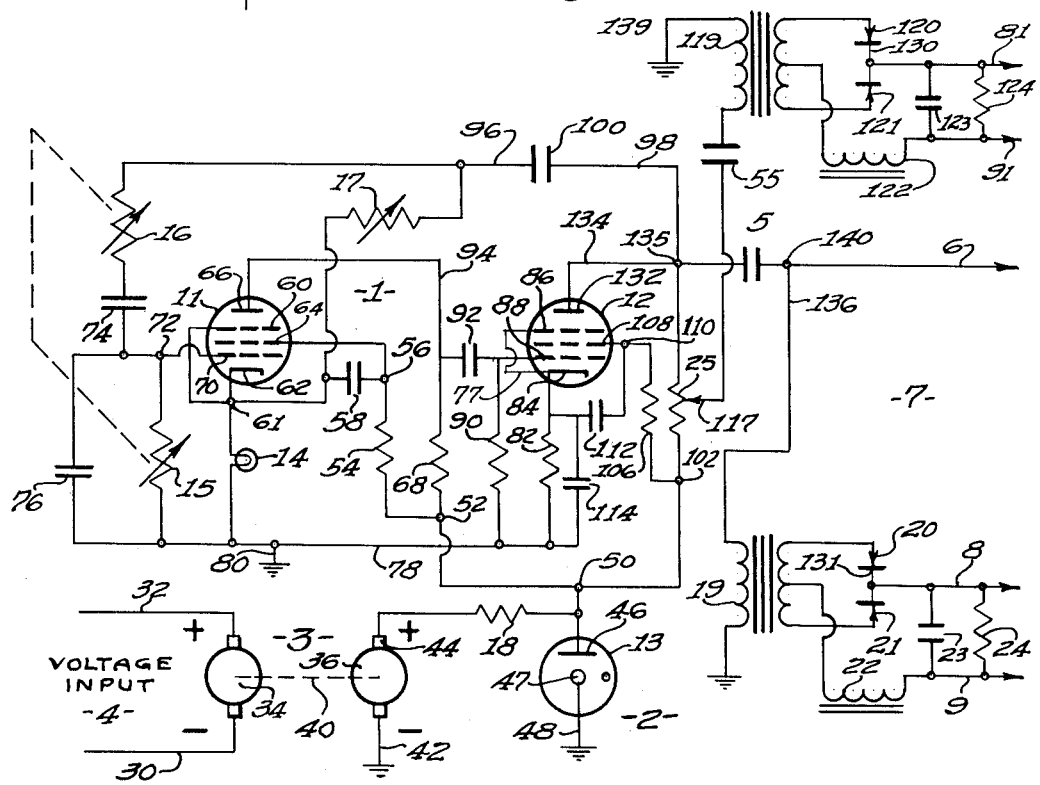
Fig. 2 shows the circuits which are merely indicated in Fig. 1.

Description of Fig. 2

Figure 1 is here more fully illustrated; for example, the plate power supply 3 of Fig. 1 is here shown in more detail. The 14 or 28 direct current voltage enters through the negative conductor 30 and positive conductor 32 indicated at 4. A motor 34 energized by this current drives the generator 36 through a shaft 40 shown diagrammatically as a broken line. The negative side of generator 36 is grounded at 42. The positive outlet 44 of generator 36 provides direct current at 250 volts which flows through a resistance 18 such that the voltage drops to 150 volts, more or less. Some of this current goes to the plate 46 of the gas-filled cold cathode voltage regulator 13 corresponding to the high voltage regulator 2 of Figure 1.

Tube 13 is known as a type OD-3 which is a gas-filled voltage regulator or "glow tube." (The dot represents gas-filled tube.) This tube 13 (OD-3) serves to hold its anode voltage very constant at 150 volts; therefore, stabilizing the high circuit voltage at this level. This tube, in conjunction with resistor 18, holds the high voltage potential 50 relatively constant regardless of how the dynamotor potential varies.

48 is the ground connection of tube 13. At junction 50 the current flowing from the positive connection 44 of generator 36 divides; that flowing to the left divides again at junction 52, and that flowing to the left from 52 flows through the 150,000 ohms resistance 54. The current divides again at 56; that which flows to the left charges the 1.0 microfarad condenser 58, and that which flows straight on flows to the middle grid 64 of tube 11. The left hand side of condenser 58 is connected to the upper grid 60 of the pentode tube 11 and to the lower cathode 62 and to the thermistor 14 in the cathode circuit of the pentode tube 11.

Thermistor 14 represents a positive temperature coefficient resistance such as an incandescent lamp. This element posesses a very sensitive resistance characteristic so that when a current flows through it, no matter how small, the resistance will vary with the quantity of current flowing. When the current rises, so will the resistance of the thermistor. The current-resistance curve is usually non-linear. The thermistor is very sensitive to temperature; in fact, it is this temperature change of its filament caused by current flow that gives it a current versus resistance curve.

Often incandescent lamps are used because they have the characteristics described. These, however, often prove undesirable because they are of a flimsy nature. The package thermistor such as the Western Electric WEIC resembles a resistor in construction and, hence, is very rugged.

The upper plate 66 of tube 11 is connected through the resistance 68 (100,000 ohms) with the junction 52.

The lowest of the three grids in the tube 11 is connected to the upper end of the variable resistance 15 at the junction 72. This lowest member of the grid is 70 and is connected through the 0.02 microfarad condenser 74 to the lower end of variable resistance 16. The broken lines indicate that the two variable resistances 15 and 16 are coupled together so that they can be varied simultaneously. Both sides of the variable resistances 15 and 16 are connected by the 0.02 mircofarad condenser 76. A grounded conductor 78 connects the lower side of condenser 76 variable resistance 15 thermistor 14 (an incandescent lamp), and is grounded at 80.

Thermistor 14 used in this circuit is actually an incandescent lamp of the following type: G. E. Mazda lamp, 110 volts, 3 watts—No current resistance of about 500 ohms.

This lamp is commonly used as a dial indicator.

A Western Electric thermistor may be used in place of the G. E. Mazda lamp.

With a ground connection 78—80, the conductor is also connected through a 500 ohm resistance 82 to the cathode element 84 of the power amplifiers and pentode tube 12. (The two tubes 11 and 12 are the essential elements of the oscillator 1 of Fig. 1.) This cathode element 84 of tube 12 is connected through conductor 77 to the uppermost grid 86 of tube 12. The lowest grid 88 is connected through the resistance 90 of 250,000 ohms to the conductor 78 grounded at 80. 88 is also connected to the right hand side of the condenser (0.5 microfarad) 92. The left hand side of this condenser 92 is connected through a conductor 94 to the upper plate 66 of tube 11 and to the 100,000 ohm resistance 68 and through the junctions 52 and 50 with the plate 46 of the tube 13. The left hand side of the 1.0 microfarad condenser 58 is connected to the left hand end of variable resistance 17 which controls the negative feed back to the oscillator.

The feedback resistance 17 serves as a path for some of the output energy fed to thermistor 14. It is seen that resistance 17 and thermistor 14 are in series forming to some degree a voltage divider. Resistor 17 is variable so that it may be adjusted to a setting where the output current at the junction 135 is of the desired voltage level and good wave shape consistent with stable oscillation. The stabilizing effect of 17 and thermistor 14 is such that should the output voltage at junction 135 rise slightly (due to ambient temperature, etc.) the current through thermistor 14 rises causing its resistance to rise, causing also in tube 11 the cathode 62 voltage to rise in the direction to diminish the amplitude of driving voltage to tube 12. In this manner stabilization of amplitude, as well as frequency, is accomplished.

The right hand end of variable resistance 17 is connected to conductor 96 which is also connected to the upper end of variable resistance 16 which is connected through the condenser 74 with the lowest grid 70 of tube 11 which is also connected to the upper part of condenser 76. Conductor 98 is connected through junction 135 to the upper end of the 5,000 ohms resistance 25 which is connected to junction 102. Junction 102 is connected through a conductor to junction 50 to the regulator 2 and to the power supply 3 of Figure 1.

Junction 102 is connected through the 10,000 ohm resistance 106 to the middle grid 108 of tube 12. This middle grid 108 is also connected at junction 110 with the right hand side of condenser 112 (1.0 microfarad). The left hand side of this condenser 112 is connected to the upper side of condenser 114 (10.0 microfarad). The lower side of this condenser 114 is connected to the conductor 78 grounded at 80. At some selected intermediate point in the resistance 25 between the conductors 104 and 98 plus condenser 110 and conductor 96, a connection 117 is made to the primary side of the transformer 119 through a condenser 55 grounded at 139. The secondary side of transformer 119 is connected through two germanium types of rectifiers 120 and 121. From the middle of the secondary coil of the transformer 119 there is a connection through a filter inductance 122 (13 henrys) to the terminal 91 (direct current). Another direct current outlet terminal 81 leads out of the connection 130 between the two rectifiers 120 and 121. A condenser 123 is connected across the two terminals 81 and 91 having a capacity of 1.0 microfarad.

A resistance 124 of 25,000 ohms is also connected across the two terminals 81 and 91.

The upper plate 132 of the tube 12 is connected through the conductor 134 to the left hand side of condensor 5 (0.05 microfarads) of the bath tub type. 135 is the junction between conductors 134 and 98. Conductor 136 is connected to the right hand side of condensor 5 through the junction 140 and with the A. C. outlet 6 which is also connected to the right hand side of condenser 5. Conductor 136 is connected to the upper end of the primary coil of the transformer 19. The lower end of this primary coil is grounded. The secondary coil of transformer 19 is connected to the two rectifiers 20 and 21 which are connected together through a conductor 131. 131 is connected to the upper half of a condensor 23 (1.0 microfarad): the lower half of the condenser 23 is connected to the direct current outlet 9 and to the filter inductance 22 (13 henrys), which is connected to the middle of the secondary coil of the transformer 19. A resistance 24 (25,000 ohms) is connected across the two direct current terminals 8 and 9. By this arrangement, two different and fairly steady direct current voltages 0 to 50 volts can be provided, one at the terminals 8 and 9, the other at the terminals 81 and 91. Obviously 3 or more different direct current voltages could be provided in addition to the alternating current outlet 6.

The specification of the circuits in Figs. 1 and 2 is as follows:

| | |
|---|---|
| Oscillator tube 11 | 6BH6. |
| Oscillator-amplifier tube 12 | 6AK6. |
| Voltage regulator tube 13 | OD3. |
| Thermistor 14 | 3 watt, 110 volt lamp. |
| Resistor 15 | 10,000 ohms. |
| Resistor 16 | 10,000 ohms. |
| Resistor 17 | 5,000 ohms. |
| Resistor 18 | 5,000 ohms. |
| Transformer 19, 119 | 3:1 ratio transformer. |
| Diode rectifier 20, 120 | Type 1N34 rectifier. |
| Diode rectifier 21, 121 | Type 1N31 rectifier. |
| Choke coil 22, 122 | 13 henrys. |
| Filter condenser 23, 123 | 1.0 microfarad |
| Resistor 24, 124 | 25,000 ohms. |
| Resistor 25 | 15,000 ohms. |
| Condenser 5, 55 | 0.5 microfarad. |
| Input lead 30 | Negative 14 or 28 volts, D. C. |
| Input lead 32 | Positive 14 or 28 volts, direct current. |
| Designation 34 | Motor part of dynamotor. |
| Designation 40 | Interconnecting shaft. |
| Designation 42 | Negative 250 volt output. |
| Designation 44 | Positive 250 volt output. |
| Designation 46 | Anode of gas tube. |
| Designation 47 | Cathode of gas tube. |
| Designation 48 | Negative or ground connection. |
| Designation 50 | Plus 150 volts at this point. |
| Designation 52 | Plus 150 volts at this point. |
| Resistor 54 | 240,000 ohms. |
| Designation 56 | Plus 100 volts here. |
| Condenser 58 | 1.0 microfarad. |
| Grid 60 | Suppressor grid. |
| Designation 62 | Cathode. |
| Designation 64 | Screen grid. |
| Designation 66 | Anode. |
| Designation 70 | Control grid. |
| Condenser 74 | .02 microfarad. |
| Condenser 76 | .02 microfarad. |
| Designation 77 | Internally connected suppressor grid. |
| Designation 80 | Ground. |
| Resistor 82 | 510 ohms. |
| Designation 84 | Cathode. |
| Designation 86 | Suppressor grid. |
| Designation 88 | Control grid. |
| Resistor 90 | 240,000 ohms. |
| Condenser 92 | .05 microfarad. |
| Designation 94 | Plate voltage of 100 volts (+). |
| Designation 96 | Feedback to 17 and 16. |
| Designation 98 | Output A. C. |
| Condenser 100 | .05 microfarad. |
| Designation 102 | Output resistor 25 connected to screen dropping resistor. |
| Designation 104 | Plus 150 volts. |
| Condenser 112 | 1.0 microfarad. |
| Condenser 114 | 1.0 microfarad. |
| Designation 110 | Plus 100 volt screen grid potential. |
| Designation 132 | Anode. |
| Designation 134 | Plus 100 volt. |
| Designation 135 | Output. |
| Designation 140 | Alternating current output. |

*Description of Figures 3 and 5.*

Figure 3 shows a basic clipper circuit for use in conjunction with a high impedence signal source and, consequently, requiring no series resistance in either input line ahead of 201 and 202. The signal voltage to be clipped appears across points 201 and 202, and when the potential of 201 becomes more positive with respect to 202 by any value greater than potential E of the reference voltage generator connected at 204, a current flow occurs upward through diode rectifier 203 causing a "shorting" effect upon the signal input source. When 202 reverses polarity and becomes more positive than 201, "shorting" does not occur at any value of input voltage since rectifier 203 will not permit current to flow in the reverse direction. By this type of action, any input voltage wave is limited to some level and not permitted to exceed the potential E of the reference voltage source at 204.

It is seen that an adustable voltage such as provided by the reference voltage generator permits a more flexible clipper unit than one obtained with a battery source of potential as shown in Figure 5, which is otherwise identical to Figure 3.

*Description of Figure 4.*

Figure 4 shows a servo network incorporating reference voltage terminals 150 and 152 across which could be connected the reference voltage generator of Figure 1. The output voltage of amplifier 154 is connected in a manner to produce a difference potential between the two sources. This difference potential called "error" voltage appearing between 152 and 156 produces a current flow around the resistance circuit composed of 176, 180, 184 and 176. Condensers 176 and 182 contribute to the voltage drops across 184 and 186, additional voltages which are proportional to the rate-of-change of the "error" voltage across 152 and 156. The voltage drops across resistors 184 and 186 are applied to grids 158 and 168 off servo amplifier tubes 160 and 170, respectively. Cathodes 163 and 173 are connected to bias resistor 188, which provides automatic bias voltages for grids 158 and 168. Plate current is supplied through 194 and flows through solenoid coils 164 and 174 and then to plates 167 and 172 to servo amplifier tubes. Solenoid cores 190 and 192 provide the necessary flux paths for the valve actuating armature.

What I claim is:

1. A voltage regulator comprising a direct current supply, a dynamotor to raise said voltage, a direct current outlet therefrom, a ground connection, a gas-filled cold cathode tube regulator located between the ground and the outlet, and connected in parallel with said direct current outlet, a wien bridge oscillator connected in parallel with said regulator, an outlet for alternating current leading directly from said oscillator, a second outlet, a rectifier and filter providing a direct current outlet therefrom.

2. A stabilized system for providing a plurality of variable reference voltages comprising a direct current supply, a dynamotor to raise said voltage, a direct current outlet therefrom, a ground connection, a gas-filled cold cathode tube regulator located between the ground and the outlet, and connected in parallel with said direct current outlet, a wien bridge oscillator connected in parallel with said regulator, an outlet for alternating current leading directly from said oscillator, a plurality of second outlets each in parallel with said outlet for alternating current, each consisting of a rectifier and a filter, thus providing a plurality of direct current outlets.

3. A stabilized system for providing a moderate flow of current derived from a reference voltage output, said output being derived from a direct current supply, a dynamotor to raise said voltage, a direct current outlet therefrom, a ground connection, a gas-filled cold cathode tube regulator located between the ground and the outlet, and connected in parallel with said direct current outlet, a wien bridge oscillator connected in parallel with said regulator, an outlet for alternating current leading directly from said oscillator, a second outlet, a rectifier and filter providing a direct current outlet therefrom.

4. A stabilized system for providing an alternating current potential adjustable over a range of 10 to 1 ratio of frequencies comprising a direct current supply, a dynamotor to raise said voltage, a direct current outlet therefrom, a ground connection, a gas-filled cold cathode tube regulator located between the ground and the outlet, and connected in parallel with said direct current outlet, a wien bridge oscillator connected in parallel with said regulator, an outlet for alternating current leading directly from said oscillator, a second outlet, a rectifier and filter providing a direct current outlet therefrom.

5. A device as set forth in claim 1 in which there are means to adjust the direct current voltage emerging from the secondary outlet comprising variable resistances incorporated in said wien bridge oscillator.

6. A device as set forth in claim 2 in which there are means to adjust the direct current voltages emerging from the secondary outlets comprising variable resistances incorporated in said wien bridge oscillator.

7. A device as set forth in claim 2 in which there is a condenser and transformer for each outlet so located as to isolate each of the individual secondary outlets from each other.

References Cited in the file of this patent

UNITED STATES PATENTS 2,207,259   Koch ------------------ July 9, 1940